US005744209A

United States Patent [19]
Parkes

[11] Patent Number: 5,744,209
[45] Date of Patent: Apr. 28, 1998

[54] SCENTED MAT PRODUCT AND METHOD FOR MAKING THE MAT PRODUCT

[75] Inventor: Timothy H. Parkes, Chattanooga, Tenn.

[73] Assignee: Remington Industries, Inc., Benton, Tenn.

[21] Appl. No.: 751,248

[22] Filed: Nov. 18, 1996

Related U.S. Application Data

[63] Continuation of Ser. No. 332,735, Nov. 1, 1994, abandoned.

[51] Int. Cl.[6] .......................... B32B 27/12; B32B 27/22; B32B 27/30
[52] U.S. Cl. .......................... 428/96; 428/95; 428/905
[58] Field of Search .......................... 428/95, 96, 905; 239/34

[56] References Cited

U.S. PATENT DOCUMENTS

| | | | |
|---|---|---|---|
| 1,683,849 | 9/1928 | Specht. | |
| 2,494,848 | 1/1950 | Whitelegg | 428/95 X |
| 2,915,427 | 12/1959 | Schriner et al. | 428/95 X |
| 2,991,208 | 7/1961 | Stieger | 428/95 X |
| 3,336,178 | 8/1967 | Levitch | 428/95 |
| 3,685,734 | 8/1972 | Paciorek. | |
| 4,254,179 | 3/1981 | Carson, III et al. | 428/95 X |
| 4,421,809 | 12/1983 | Bish et al. | 428/95 X |
| 4,822,669 | 4/1989 | Roga | 428/287 |
| 4,876,135 | 10/1989 | McIntosh | 428/95 X |
| 4,880,690 | 11/1989 | Szycher. | |
| 4,882,220 | 11/1989 | Ono. | |
| 4,908,252 | 3/1990 | Carnahan. | |
| 4,917,920 | 4/1990 | Ono. | |
| 4,990,381 | 2/1991 | Holzner. | |
| 5,156,843 | 10/1992 | Leong. | |
| 5,185,169 | 2/1993 | Yamamoto | 428/905 X |
| 5,254,386 | 10/1993 | Simpson et al. | 428/96 X |

FOREIGN PATENT DOCUMENTS

| | | |
|---|---|---|
| 2801636 | 7/1979 | Germany. |
| 53-111200 | 2/1977 | Japan. |

*Primary Examiner*—Daniel Zirker
*Attorney, Agent, or Firm*—Baker, Donelson, Bearman & Caldwell

[57] ABSTRACT

A low cost, high quality, durable mat product having a fragrance or scent incorporated in the backing material so that the scent is evenly dispersed throughout the environment of the mat for an extended period of time. Also disclosed is a method for making the mat product by adding a scent or fragrance to the backing material used in the mat product prior to securing the backing material to a textile layer.

15 Claims, 2 Drawing Sheets

5,744,209

SCENTED MAT PRODUCT AND METHOD FOR MAKING THE MAT PRODUCT

This application is a continuation of application Ser. No. 08/332,735, filed Nov. 1, 1994, now abandoned.

The present invention relates generally to scented mat products and a method for manufacturing the mats. More particularly, the invention relates to low cost, high quality, durable mat products having a fragrance or scent incorporated into the backing and a process for safely, efficiently, and economically manufacturing high quality mats which emit a scent or fragrance into the surrounding environment over an extended period of time.

BACKGROUND OF THE INVENTION

Most vehicles, homes, and workplaces utilize textile products to provide a more clean, comfortable, and/or decorative environment. For example, car floors are provided with carpeting and often with seat covers made of textile materials. Further, most homes and offices are provided with some type carpeting, drapery, and/or upholstery which is made of textile material. However, due to their porous, fibrous construction, these textile materials have a pronounced tendency to absorb and accumulate odors from the surrounding environment.

Floor mats are some of the most common products which make use of textile materials. Almost every vehicle, household and business has a need for mats to cover a portion of the flooring. Ordinarily, floor mats are used in high traffic areas to protect underlying carpeting from dirt, stains and excess wear and tear. Skid-resistant mats also are used as a safety precaution in homes and workplaces. Floor mats constructed of special materials are often used to reduce strain for workers who must stand in one place for long periods of time. Of course, some mats are used merely to enhance the decor and provide a more aesthetically pleasing environment. However, floor mats are especially prone to retaining objectionable odors from the dirt and grit which is transferred to them from foot traffic and spills which are absorbed into the carpet.

Many products have been offered as a means to mask or eliminate offensive odors from an environment. Fragrances in spray form or coated on solid carriers are well-known. These products are generally effective for only very short periods of time, and must be reapplied or replaced at frequent intervals in order to maintain their effectiveness. Moreover, it is usually difficult to regulate the amount and location of the odor-reducing properties of known products. For example, traditional fragrances used to mask offensive odors are highly concentrated chemicals. This results in the masking scent being released in a concentrated area of the environment. It is particularly difficult to regulate the diffusion of a masking scent evenly throughout a closed environment, such as the interior of an automobile.

The present invention overcomes these and other problems in the prior art by providing a novel method for manufacturing a low cost, high quality, durable mat product which has a scent or fragrance incorporated into the material which forms the backing of the mat. The scented mat of the present invention replaces the odor-absorbing floor mats previously used, thus greatly reducing the amount of odor-retaining textile products in an environment, such as a car interior. Since the scented mat of the present invention is spread over a large surface area, the scent or fragrance incorporated in the mat is released and disperses evenly throughout the environment. Further, because the scent is incorporated into the backing material of the mat, the scent is emitted at substantially its original strength over an extended period of time.

SUMMARY OF THE INVENTION

The present invention is a low cost, high quality, durable mat product which has a scent or fragrance incorporated into a liquid backing material prior to curing. The mat is formed by preparing a liquid backing material, mixing a suitable amount of scent or fragrance with the liquid backing material, and forming a substantially horizontal layer of the scent-emitting backing material. A length of textile material is positioned on the upper surface of the scented backing layer and the textile layer and backing layer are subjected to sufficient heat to transform the liquid backing layer into a solid sheet. The solid scented backing layer provides support for the textile layer and continuously emits an evenly dispersed scent or fragrance into the environment surrounding the scented mat product.

In a particularly preferred embodiment of the scented mat of the present invention, the textile layer is a length of tufted material in which tufts of yarn have been stitched to form standard griege loop pile or cut pile carpeting. However, any equivalent or manufacturing process material which provides the protective and/or decorative features characteristic of matting products is suitable for use as the textile layer in the scented mat of the present invention. Alternatively, the scented mat of the present invention, can be composed entirely of the backing material used to form the backing layer, without a top layer of carpet material. Such scented mats would be useful, for example, in areas exposed to leaks and spills of slippery substances or workstations requiring a support mat for workers who must remain standing for long periods of time.

Preferably, the backing material used in the scented mat of the present invention is a polyvinyl chloride compound which contains resins, plasticizers, and stabilizers which are well known in the art, as well as any fillers, pigments, viscosity control additives, or blowing agents which may be needed to achieve the desired characteristics of the final scented mat product. Polyvinyl chloride mixtures are particularly suitable because the plasticizers commonly added to the mixture tend to fog out of the mixture over time. As the plasticizers fog, the scent or fragrance which is added to the backing compound is evenly dispersed throughout the environment surrounding the mat product. In an alternate embodiment, the backing layer of the scented mat or the entire scented mat of the present invention may be composed of a water-based latex material rubber or a urethane based material.

A volatile component which gives of a scent or fragrance is added to the liquid backing material prior to transforming the backing material into a solid layer. In a particularly preferred embodiment, a scent or fragrance composition is mixed with a liquid polyvinyl chloride resin dispersion prior to curing. Any scent or fragrance composition can be used in the scented mat of the present invention as long as the scent or fragrance composition is compatible with the chosen backing material and remains stable during the manufacturing process. For example, when a PVC compound is used for the backing material, it is necessary to use an oil-based scent in order to insure proper mixing between the scent and the PVC compound. Similarly, when a water-based latex compound is used as the backing material, a water-based scent should be chosen so that the scent will mix thoroughly with the backing compound.

The present invention also provides a novel method for making low cost, high quality, durable scented mat products. After a scent is selected and mixed with a suitable backing compound, the liquid backing material is deposited onto a Teflon® coated belt or other transport device. The liquid backing material is formed into a substantially horizontal layer or uniform thickness by means of a doctor bar or similar device. As the scented backing layer is moved along on the Teflon® belt, a layer of textile material is disposed on the upper surface of the layer of backing material. The carpet layer is pressed into the backing layer to a depth sufficient to secure the tufts of yarn by means of pressure rollers which are calibrated to provide a layered mat product of uniform thickness and width. The two layers are then heated to a temperature sufficient to cure the liquid backing material. After cooling, the length of mating material or rolled goods travels up and over a series of vertically disposed rollers which form a tower type structure. As the matting material travels down the opposite side of the tower, it passes over a set of vertically positioned heaters which soften the vinyl backing material prior to passing through an embossing device. After recooling, the embossed matting material is ready to be wound onto rolls or passed to a cutting press which stamps the matting material into scented mat products of the desired shape and size.

These and other features of the present invention will become apparent to those skilled in the art from the drawings and the following detailed description.

DETAILED DESCRIPTION OF THE INVENTION

Figure 1:
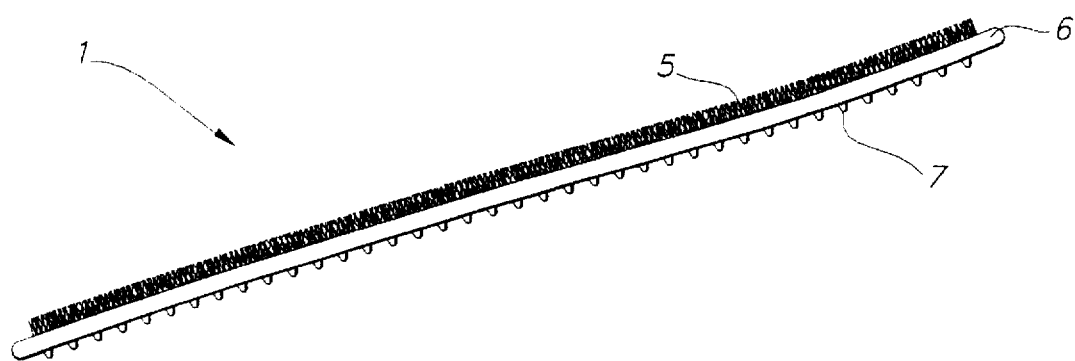
FIG. 1 is a side view of the scented mat product of the present invention.
Figure 2:
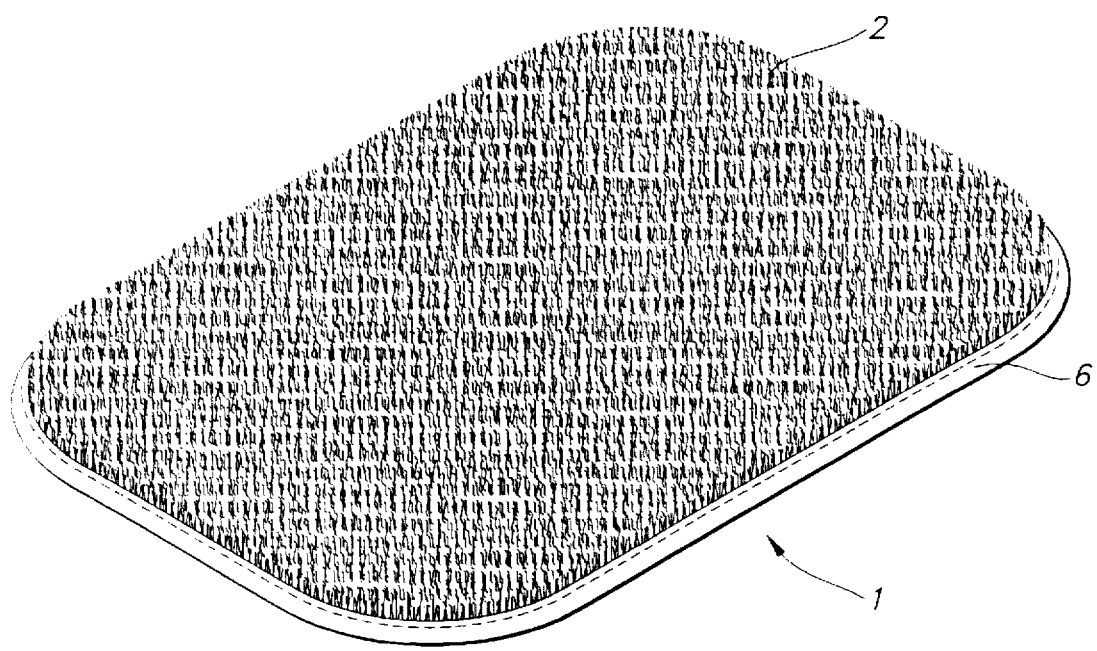
FIG. 2 is a perspective view of the scented mat product of the present invention.

Referring to the drawings, there is shown in FIG. 1 the scented mat product 1 of the present invention, which is made by incorporating a scent or fragrance into the backing material prior to curing. In an important embodiment of the invention, the scented mat 1 comprises a layer of pile carpet material which is irremovably secured to and supported by a layer of scent emitting cured vinyl backing material.

As shown in FIG. 1, the scented mat 1 has a layer of cut pile yarn 2 tufted into the woven primary backing to form carpet face 5. The carpet face 5 is supported by a layer of vinyl backing 6 to which a scent or fragrance has been added prior to curing. While the carpet face 5 is shown as a cut pile type of carpeting, it is to be understood that loop pile or any other textile material, such as non-wovens, knits or any equivalent thereof may be used in the scented mate of the present invention. Further, the scented mat of the present invention is not limited to mats incorporating carpet materials, but includes mats made entirely of vinyl or vinyl-type materials, water-based latex materials, urethanes and rubber, natural or synthetic or any combination or equivalent thereof.

Figure 3:
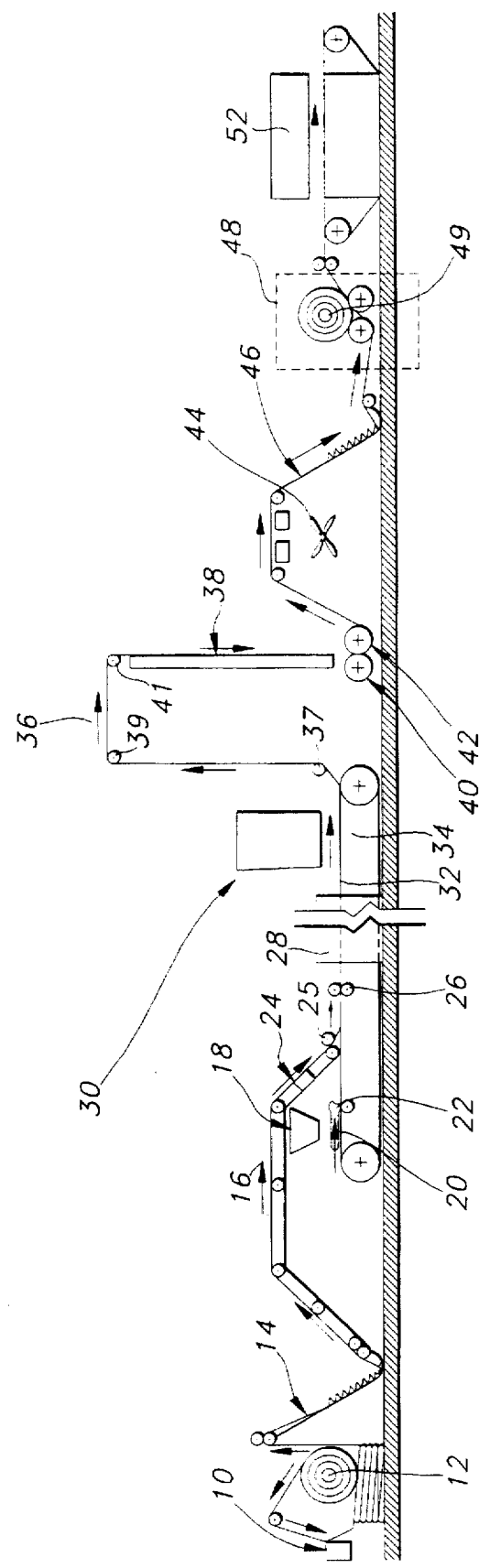
FIG. 3 is a diagram illustrating a method of making the scented mat product of the present invention.

The method of making the scented mat 1 incorporates several novel steps which contribute to the safety, efficiency, and cost effectiveness of manufacturing a high quality scented mat product. As shown in FIG. 3, a typical scented mat 1 is manufactured by first attaching a roll of tufted cut pile carpeting 12 to a sew on unit 10. Carpet or textile rolls 12 generally are available in 500 ft lengths which must be sewn together at sew on unit 10 to provide a continuous length of textile material 13. From sew on unit 10, the length of textile material 13 travels through a J box 14, which serves as a staging area for retaining lengths of textile material 13 prior to further processing. From J box 14, textile material 13 travels up and over lay on area 16. A vinyl reservoir 18 is provided under lay on area 16 for depositing liquid scent-containing vinyl in a puddle 20 onto a continuous fiberglass Teflon® coated belt 32. Typically, vinyl reservoir 18 operates by gravity utilizing a series of valves and is continually fed from standard tote containers or bulk storage tank in which the vinyl and scent components are initially combined.

In a preferred embodiment, the backing layer 6 is composed of a polyvinylchloride (PVC) compound which contains resins, plasticizers, fillers and other additives which are known in the art. The PVC compound is mixed with a suitable fragrance or scent prior to being fed into vinyl reservoir 18. Since PVC compounds are oil based materials, it is important that only oil-based scent or fragrances be added to the PVC compound in order to achieve a homogeneous mixture. As will be appreciated by those skilled in the art, many combinations of resins, plasticizers, fillers, and scent compositions can be used to form the vinyl backing 6, depending upon the compatibility of the components and the desired effect. Generally, the scent or fragrance composition is added to the vinyl backing compound in an amount of between about 0.05 and 20% by weight of the total volume of backing material.

As the vinyl puddle 20 passes under doctor bar 22, vinyl puddle 20 is leveled into a layer having a uniform thickness. Doctor bar 22 also is used to determine how many ounces of vinyl are used to form vinyl layer 6. As textile layer 5 moves down lay on area 16, it passes over preheaters 24 to soften up the textile material and remove any wrinkles in the textile layer 5. The preheating step is important to production of a higher volume of first quality mats. After passing over the preheaters, textile material 5 moves under Helical roller 25. Helical roller 25 is a dewrinkling device which forces wrinkles toward the outer edges of textile layer 5. As textile material 5 passes under Helical roller 25, it meets the vinyl puddle 20 traveling on Teflon® belt 32. Both textile layer 5 and vinyl puddle 20 then pass through pressure rollers 26. Pressure rollers 26 gently push textile layer 5 into vinyl puddle 20 just enough to provide tuft lock for textile layer 5. Pressure rollers 26 also assist in providing a mat 1 which is of uniform thickness. Generally, the vinyl layer 6 may contain between about 40 ounces per square yard and 106 ounces per square yard. Prior to the method of the present invention, the backing layer was applied to the bottom surface of a textile layer. By forming the backing layer first and then applying the textile layer, it is possible to produce a high quality mat product having a significantly more uniform thickness.

After leaving pressure rollers 26, the textile layer 5 adjoined to vinyl backing layer 6 passes into oven 28 to cure the vinyl. The oven 28 is maintained at a temperature of between about 380 and 400 degrees Fahrenheit. While vinyl generally cures at around 350 degrees F., the gauge of the vinyl and the material layer dictate the temperature and speed at which the oven can be run. Significantly, oven 28 is chambered in such a way as to provide heat only under Teflon® belt 32. The heat from Teflon® belt 32 then cures vinyl layer 5. In one embodiment, four fans are provided in the oven, two which blow the length of the oven and two which blow down toward the heaters. The heated air circulating in the oven also contributes to blossoming of the tufts in textile layer 5.

The oven 28 used in the method of the present invention is approximately 70 feet in length, which is about 20 feet longer than ovens commonly used in the prior art to cure vinyl. Subjecting the vinyl layer 6 to heat in oven 28 for a longer period of time produces a higher quality product by providing a better cure for the vinyl and rendering the final product less susceptible to cracking or tender vinyl.

As the Teflon® belt 32 carrying the curved backing layer 6 leaves oven 28, the temperature of backing layer 6 is at about 280 degrees and the temperature of the textile layer 2 is at about 180 degrees. Since backing layer 6 cannot be removed from Teflon® belt 32 until the temperature of vinyl layer 6 is lowered to about 180 degrees F., Teflon® belt 32 passes through cool off area 30. In a preferred embodiment, a twenty ton closed system water chiller is provided which sprays chilled water through jets onto the underside of Teflon® belt 32 at point 34. The water is recycled from troughs placed under Teflon® belt 32.

In a particularly novel step of the method of the present invention, a tower 36 is provided to carry backing layer 6 off Teflon® belt 32 to ceramic preheaters 38 to soften vinyl layer 5 for the embossing step. Prior to the present invention, in order to prepare the vinyl for embossing, it was necessary to pass the vinyl layer in a horizontal direction directly over the source of heat. The prior art method presents a serious safety hazard for workers because the vinyl tends to melt and drop directly onto the heaters causing a significant number of fires. Further, the prior art method results in the production of fewer first quality pieces.

As shown in FIG. 3, these problems have been overcome by providing a series of rollers 37, 39, and 41 which are vertically arranged to a height of preferably about 12 feet. As backing layer 5 passes off Teflon® belt 32, it passes under roller 37 and up over rollers 39 and 40. As backing layer 6 travels down from roller 41, it passes by ceramic preheaters 38. Ceramic preheaters 38 are mounted in a vertical arrangement so that backing layer 6 passes over ceramic preheaters 38 in a vertical direction. The vertical arrangement of the preheating step prevents any dripping of melted vinyl directly onto the heaters as the vinyl is softened for the embossing step.

After backing layer 6 is sufficiently softened by preheaters 38, it moves over embossing roller 40 which provides the surface of backing layer 6 with skid resistant nibs 7. Although any type of embossing may be used on the mat of the present invention, preferably, embossing roller 40 is a female type die. In a preferred embodiment, pressure roller 42 cooperates with embossing roller 40 to provide sufficient pressure to force softened backing layer 6 into the pattern of openings arranged in embossing roller 40. In a particularly preferred embodiment of the present method, an air-assisted hydraulic system is used to control the amount of pressure provided by pressure roller 42.

The embossed backing layer 6 then travels over cooling fans 44 and onto J box 46, which serves as a staging area to retain any excess length of backing layer 6 until it can be further processed. As shown in FIG. 3, at this point, backing layer 7 can either be wound into rolls 49 for shipment to customers, or moved directly to a cutting press 52 where backing layer 6 is stamped into shapes which are suitable for use as floor mats.

When backing layer 6 is cut into mats, the final scented mat products are sealed in air tight bags so that substantially all of the fragrance or scent remains in the mat product prior to purchase and use by the consumer. After removing the scented mat from the air tight packaging, the scented mat of the present invention continuously emits the scent or fragrance into the environment surrounding the mat at substantially its original strength for a period of between about four to six months, depending upon the temperature of the environment in which the mat is placed.

The invention may be embodied in other specific forms without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A durable scented mat product which comprises a textile layer, a backing layer formed from a composition which contains a polyvinyl chloride and a plasticizer, said backing layer being irremovably secured to said textile layer by curing, and a volatile scent-emitting component, said scent-emitting component being incorporated into said composition prior to curing said volatile scent-emitting component being a scent which is continuously emitted into the environment surrounding the mat at substantially an original strength level for a period of at least four months after the mat is exposed to the environment.

2. A durable scented mat product according to claim 1 wherein said textile layer is selected from the group consisting of cut pile and loop pile carpeting.

3. A durable scented mat product according to claim 1 wherein said volatile scent-emitting component is an oil-based fragrance composition.

4. A durable scented mat product according to claim 1 wherein said scent-emitting component is incorporated into said composition in an amount of between about 0.05% and 20% by weight of the total volume of said composition.

5. A durable scented mat product according to claim 1 wherein said scent-emitting component is incorporated in said composition in an amount of between about 0.05% and 2.0% by weight of the total volume of said composition.

6. A durable scented mat product which comprises a textile layer, a backing layer formed from a polyvinyl chloride and a plasticizer based composition which is irremovably secured to said textile layer by curing, and a volatile component which continuously emits an original strength scent into the environment surrounding the mat for a period of at least four months after the mat is exposed to the environment, said volatile component being incorporated into said polyvinyl chloride based composition prior to curing.

7. A durable scented mat product according to claim 6 wherein said textile layer is selected from the group consisting of cut pile and loop pile carpeting.

8. A durable scented mat product according to claim 6 wherein said volatile scent-emitting component is an oil-based fragrance composition.

9. A durable scented mat product according to claim 6 wherein said scent-emitting component is incorporated into said polyvinyl chloride based composition in an amount of between about 0.05% and 20% by weight of the total volume of said composition.

10. A durable scented mat product according to claim 6 wherein said scent-emitting component is incorporated in said polyvinyl chloride based composition in an amount of between about 0.05% and 2.0% by weight of the total volume of said composition.

11. A durable scented mat product comprising a polyvinyl chloride and a plasticizer based composition which is cured to form a solid mat and a volatile component which is added to the polyvinyl chloride composition prior to curing, said volatile component being a scent which is continuously emitted into the environment surrounding the mat at substantially an original strength level for a period of at least four months after the mat is exposed to the environment.

12. A durable scented mat product according to claim 11 wherein said scent-emitting component is incorporated into said polyvinyl chloride based composition in an amount of between about 0.05% and 20% by weight of the total volume of said composition.

13. A durable scented mat product according to claim 11 wherein said scent-emitting component is incorporated in said polyvinyl chloride based composition in an amount of between about 0.05% and 2.0% by weight of the total volume of said composition.

14. A durable scented floor mat which comprises:

a textile layer;

a backing layer formed from composition containing a polyvinyl chloride and a plasticizer, said backing layer being irremovably secured to said textile layer by curing; and a volatile scent-emitting component which is incorporated into and dispersed throughout said composition prior to curing so that the scent-emitting component is continuously released and evenly distributed into the environment surrounding the floor mat for at least four months.

15. A durable scented floor mat which comprises composition containing a polyvinyl chloride, a plasticizer, and a scent-emitting component, said composition being cured to form a mat, and said scent-emitting component being added to said composition prior to curing the composition, said scent-emitting component being a scent which is continuously emitted into the environment surrounding the mat at substantially an original strength for a period of at least four months after the mat is exposed to the environment.

* * * * *